(12) United States Patent  (10) Patent No.: US 9,113,613 B2
Dixon  (45) Date of Patent: Aug. 25, 2015

(54) EXCREMENT DEPOSITORY ASSEMBLY

(71) Applicant: Andrai C. Dixon, Brampton (CA)

(72) Inventor: Andrai C. Dixon, Brampton (CA)

( * ) Notice: Subject to any disclaimer, the term of this patent is extended or adjusted under 35 U.S.C. 154(b) by 0 days.

(21) Appl. No.: 14/625,181

(22) Filed: Feb. 18, 2015

(65) Prior Publication Data

US 2015/0156991 A1   Jun. 11, 2015

Related U.S. Application Data

(63) Continuation of application No. 13/731,156, filed on Dec. 31, 2012.

(51) Int. Cl.
*A01K 23/00* (2006.01)

(52) U.S. Cl.
CPC ....................................... *A01K 23/00* (2013.01)

(58) Field of Classification Search
USPC .................................................. 119/868, 867
See application file for complete search history.

(56) References Cited

U.S. PATENT DOCUMENTS

| | | | |
|---|---|---|---|
| D229,321 S | | 11/1973 | Francis |
| 4,103,645 A | * | 8/1978 | Tyler .............................. 119/868 |
| 4,156,402 A | | 5/1979 | Naiztat |
| 4,269,148 A | | 5/1981 | Holley-Donawa |
| 4,444,152 A | | 4/1984 | Berardo |
| 4,458,932 A | | 7/1984 | Resch |
| 5,146,874 A | * | 9/1992 | Vidal ............................. 119/868 |
| 5,315,960 A | | 5/1994 | Lamp |
| 5,819,691 A | | 10/1998 | Lavi et al. |
| 6,494,168 B2 | | 12/2002 | Weng |
| 6,722,319 B1 | * | 4/2004 | Chiu .............................. 119/868 |
| 7,861,677 B2 | * | 1/2011 | Habig ............................ 119/868 |
| 2008/0127909 A1 | * | 6/2008 | Albalas et al. ................ 119/868 |

* cited by examiner

*Primary Examiner* — Kristen C Hayes

(57) ABSTRACT

An excrement depository assembly includes a tubular garment that may be positioned on a rear of an animal. A collection bag is removably coupled to the tubular garment so the collection bag may receive animal excrement.

6 Claims, 4 Drawing Sheets

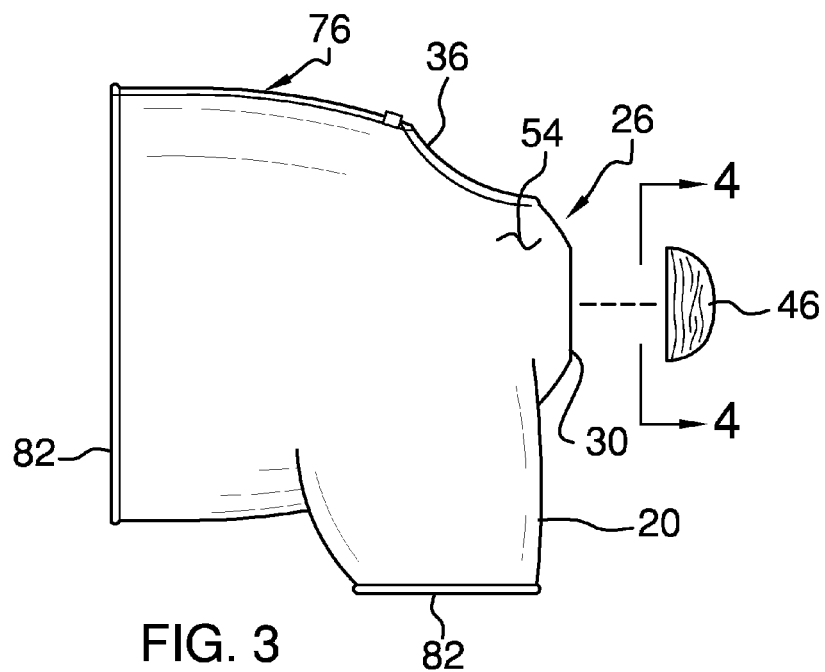
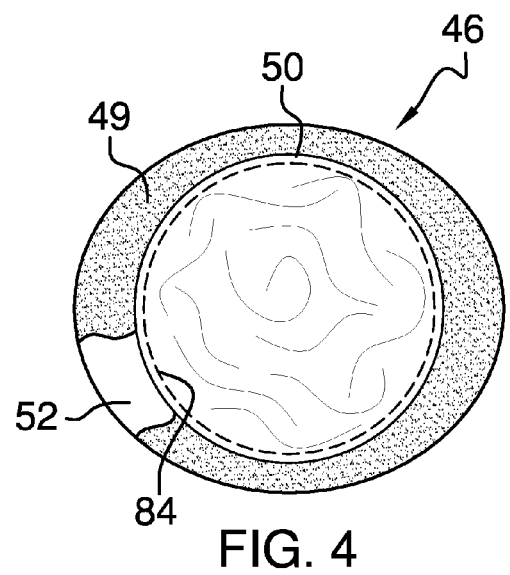

EXCREMENT DEPOSITORY ASSEMBLY

I hereby claim the benefit under Title 35, United States Code, Section 120 of U.S. application Ser. No. 13/731,156 filed on Dec. 31, 2012.

BACKGROUND OF THE DISCLOSURE

Field of the Disclosure

The disclosure relates to excrement depository devices and more particularly pertains to a new excrement depository device for collecting animal excrement.

SUMMARY OF THE DISCLOSURE

An embodiment of the disclosure meets the needs presented above by generally comprising a tubular garment that may be positioned on a rear of an animal. A collection bag is removably coupled to the tubular garment so the collection bag may receive animal excrement.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a left side view of an embodiment of the disclosure.

FIG. 4 is a front view of an embodiment of the disclosure.

DESCRIPTION OF THE PREFERRED EMBODIMENT

Figure 1:
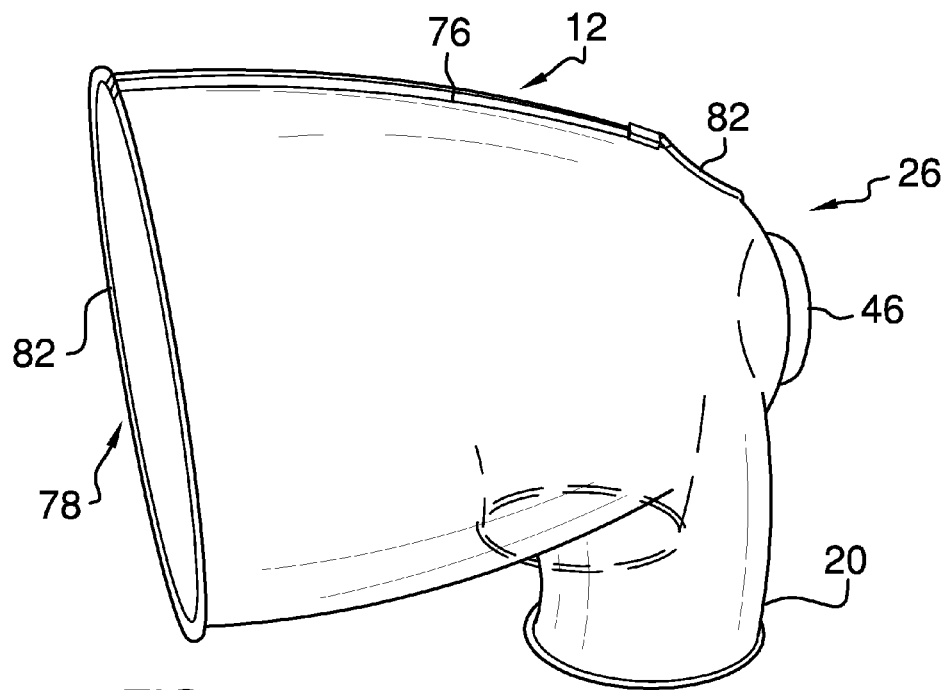
FIG. 1 is a perspective view of an excrement depository assembly according to an embodiment of the disclosure.
Figure 2:
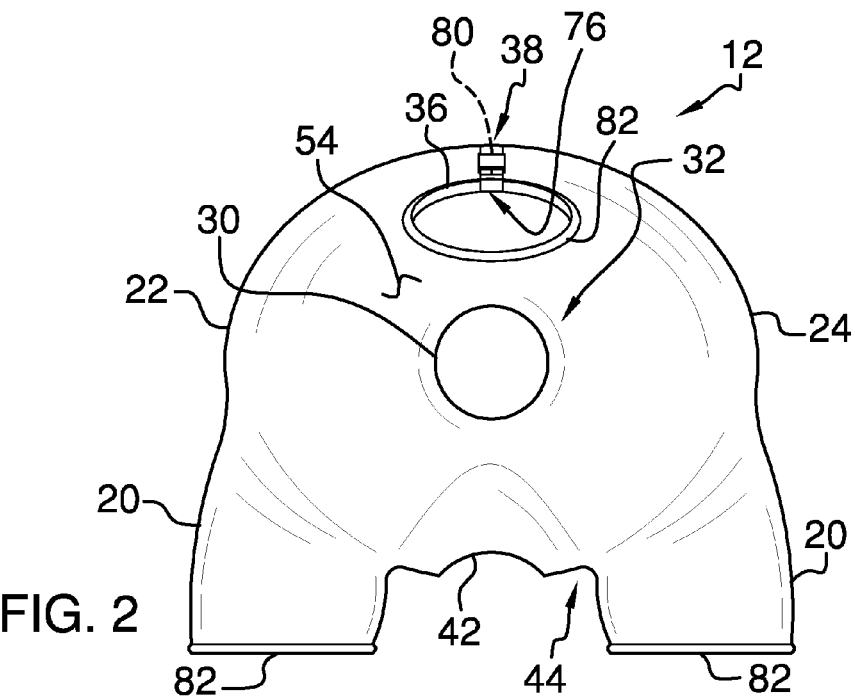
FIG. 2 is a back view of an embodiment of the disclosure.
Figure 5:
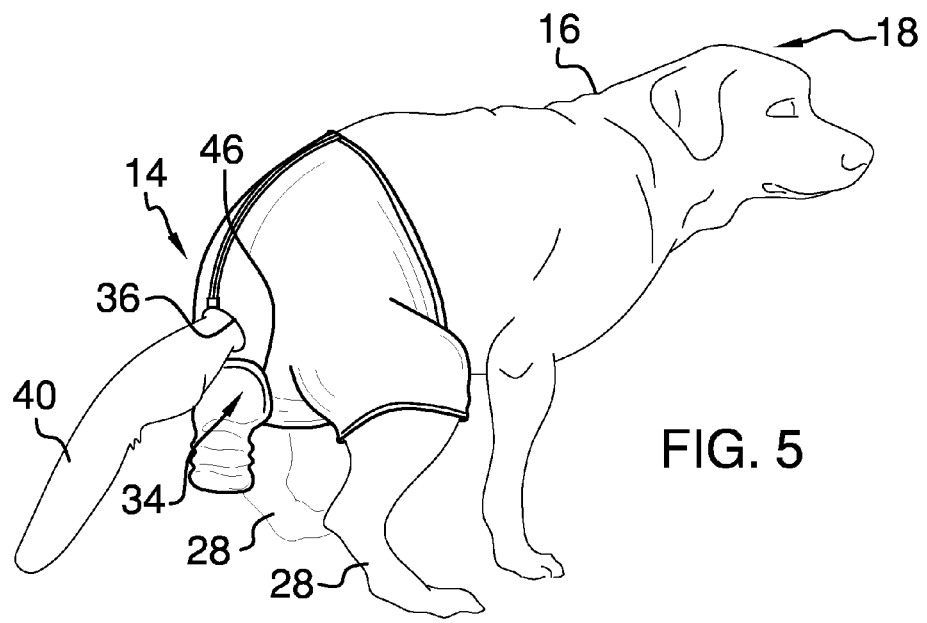
FIG. 5 is an in-use view of an embodiment of the disclosure.
Figure 6:
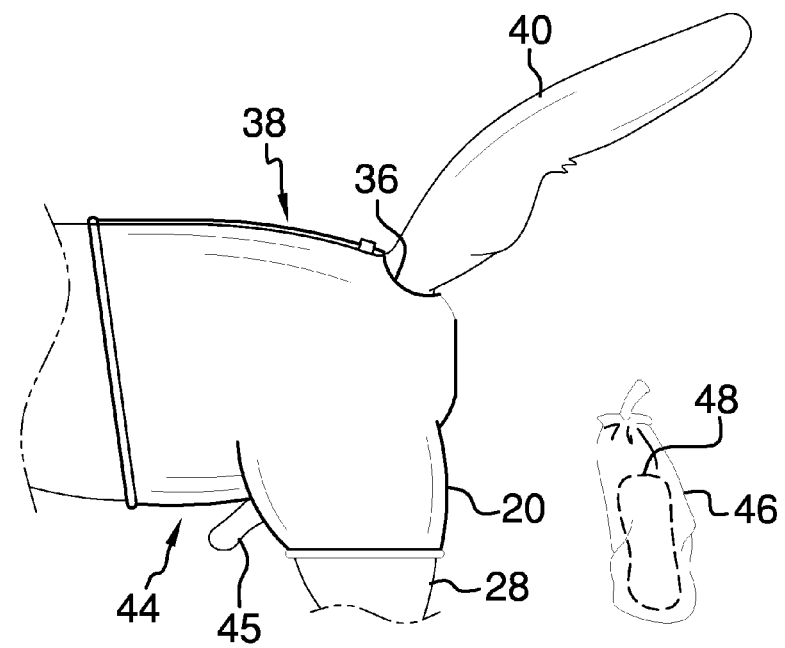
FIG. 6 is a right side perspective view of an embodiment of the disclosure.
Figure 7:
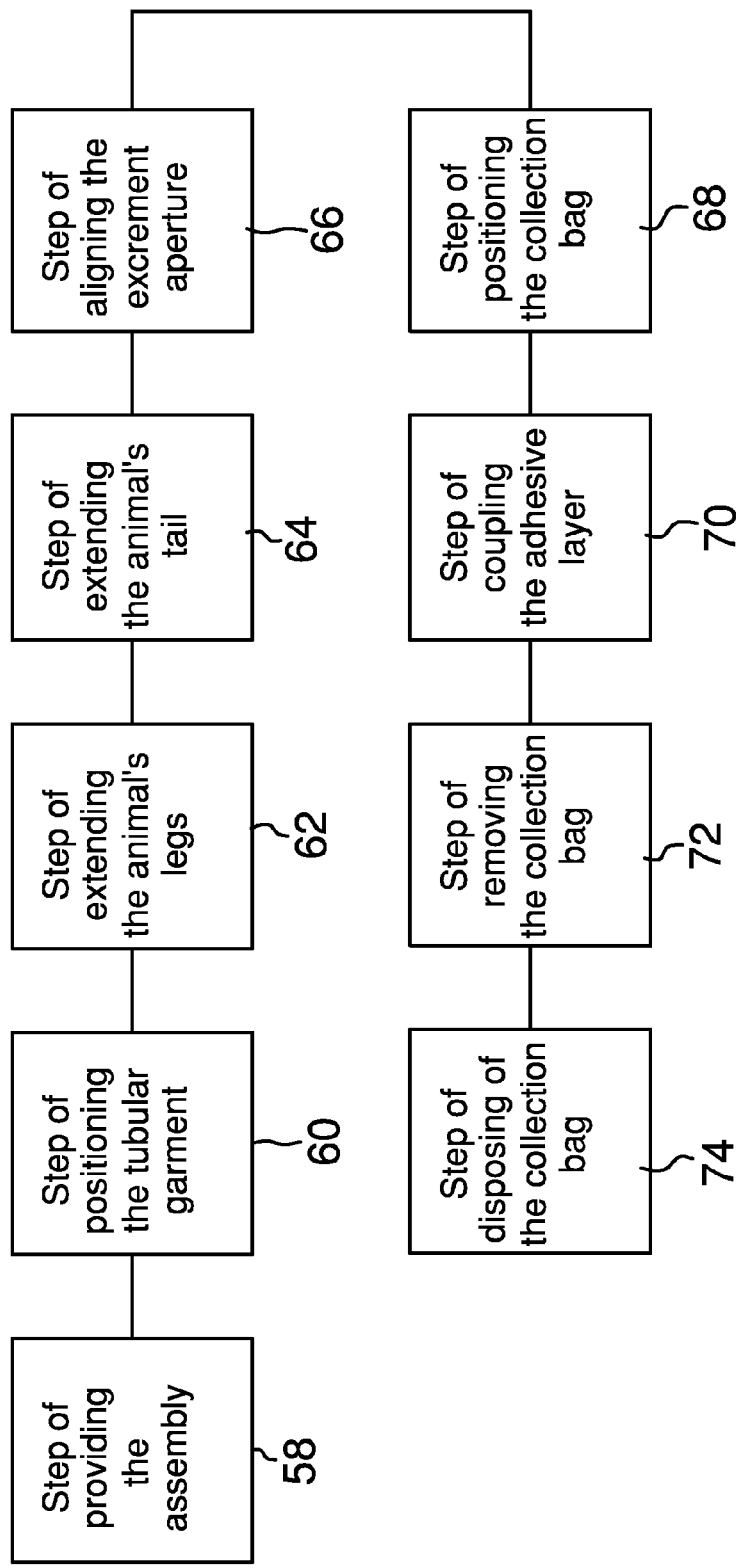
FIG. 7 is a schematic view of a method of utilizing an embodiment of the disclosure.

With reference now to the drawings, and in particular to FIGS. 1 through 7 thereof, a new excrement depository device embodying the principles and concepts of an embodiment of the disclosure and generally designated by the reference numeral 10 will be described.

As best illustrated in FIGS. 1 through 7, the excrement depository assembly 10 generally comprises a substantially tubular garment 12 that may be positioned on a rear 14 of an animal 16. The animal 16 may be a dog 18. The tubular garment 12 may be comprised of a deformable and air permeable material. The tubular garment 12 comprises a pair of garment legs 20 each coupled to and extending downwardly from an associated one of a first lateral side 22 and a second lateral side 24 of the tubular garment 12. Each of the garment legs 20 are positioned proximate a back 26 of the tubular garment 12 so the pair of garment legs 20 may each insertably receive an associated one of each of the animals rear legs 28.

An excrement aperture 30 extends through a central point 32 off the back 26 of the tubular garment 12. The excrement aperture 30 may be aligned with the animal's anus 34 so the animal 16 may defecate through the excrement aperture 30. A tail aperture 36 extends through the back 26 of the tubular garment 12 proximate a top 38 of the tubular garment 12. The tail aperture 36 may insertably receive the animal's tail 40 when the tubular garment 12 is positioned on the animal 16. A slit 76 may be provided in the garment 12 extending between a forward end 78 of the garment 12 and the tail aperture 36. A fastener 80 such as a reusable adhesive or complimentary hook and loop fasteners is coupled to and extends along the slit 76 to close the garment 12 around the animal 16 securing the garment 12 on the animal 16. The forward end 78 of the garment, the tail aperture 36 and each of the garment legs 20 may each be lined with a respective elastic or gathered band 82 to provide a secure fit to the animal 16.

A genitalia aperture 42 extends through a bottom 44 of the tubular garment 12 proximate the back 26 of the tubular garment 12. The genitalia aperture 42 may insertably receive the animal's genitalia 45 to allow the animal 16 to urinate after the tubular garment 12 is positioned on the animal 16.

A collection bag 46 may be removably coupled to the tubular garment 12 so the collection bag 46 may receive the animal's excrement 48. The collection bag 46 may be comprised of a deformable and air-impermeable material such as plastic or other similar material. The collection bag 46 may be one of a plurality of collection bags 46.

An adhesive layer 49 is coupled to a perimeter of an opening 50 in the collection bag 46. A protective strip 52 is removably coupled to the adhesive layer 49. After the protective strip 52 is removed from the adhesive layer 49, the collection bag 46 may be positioned around the excrement aperture 30 so the adhesive layer 49 engages an outside surface 54 of the tubular garment 12. The adhesive layer 49 retains the collection bag 46 on the tubular garment 12 so the collection bag 46 may receive the animal's excrement 48. Each collection bag 46 may have perforations 84 adjacent to the adhesive layer 49 to facilitate removal of the attached collection bag 46 after use. A subsequent collection bag 46 may then be coupled to the garment 12 using the adhesive layer 49.

In use, the assembly 10 allows for a method 56 of containing the animal excrement 48, the steps of the method 56 comprise a step 58 of providing the tubular garment 12, the pair of garment legs 20, the excrement aperture 30, the tail aperture 36, the genitalia aperture 42, the collection bag 46 and the adhesive layer 49. The method 56 also includes a step 60 of positioning the tubular garment 12 on the rear 14 of the animal 16. The method 56 further includes a step 62 of extending each of the animal's rear legs 28 downwardly through each of the garment legs 20.

Additionally, the method 56 includes a step 64 of extending the animal's tail 40 upwardly through the tail aperture 36. The method 56 further includes a step 66 of aligning the excrement aperture 30 with the animal's anus 34. The method 56 includes a step 68 of positioning the collection bag 46 around the excrement aperture 30.

Continuing, the method 56 includes a step 70 of coupling the adhesive layer 49 to the outside surface 54 of the tubular garment 12. The method 56 also includes a step 72 of removing the collection bag 46 from the tubular garment 12 after the animal 16 defecates into the collection bag 46. Finally, the method 56 includes a step 74 of disposing of the collection bag 46 containing the animal's excrement 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An excrement depository assembly configured to be worn by an animal, said assembly comprising:
    a tubular garment configured to be positioned on a rear of an animal;
    a collection bag removably coupled to said tubular garment wherein said collection bag is configured to receive animal excrement;
    an adhesive layer coupled to a perimeter of an opening in said collection bag;
    an excrement aperture extending through said tubular garment; and
    said collection bag being positionable around said excrement aperture wherein said adhesive layer engages an outside surface of said tubular garment wherein said adhesive layer retains said collection bag on said tubular garment wherein said collection bag receives the animal's excrement.

2. The assembly according to claim 1, further comprising said garment comprising an open front end configured to insertably receive the rear of the animal.

3. The assembly according to claim 1, further comprising said tubular garment comprising a pair of garment legs each coupled to and extending downwardly from an associated one of a first lateral side and a second lateral side of said tubular garment proximate a back of said tubular garment wherein said pair of garment legs are configured to insertably receive an associated one of each of the animal's rear legs.

4. The assemble according to claim 1, further comprising a tail aperture extending through said back of said tubular garment proximate a top of said tubular garment wherein said tail aperture is configured to insertably receive the animal's tail.

5. The assembly according to claim 1, further comprising a genitalia aperture extending through a bottom of said tubular garment proximate a back of said tubular garment wherein said genitalia aperture is configured to insertably receive the animal's genitalia.

6. An excrement depository assembly configured to be worn by an animal, said assembly comprising:
    a tubular garment comprising an open front end configured to insertably receive a rear of an animal, said tubular garment comprising;
    a pair of garment legs each coupled to and extending downwardly from an associated one of a first lateral side and a second lateral side of said tubular garment proximate a back of said tubular garment wherein said pair of garment legs are configured to insertably receive an associated one of each of the animal's rear legs;
    an excrement aperture extending through a central point of said back of said tubular garment wherein said excrement aperture is configured to be aligned with the animal's anus;
    a tail aperture extending through said back of said tubular garment proximate a top of said tubular garment wherein said tail aperture is configured to insertably receive the animal's tail;
    a genitalia aperture extending through a bottom of said tubular garment proximate said back of said tubular garment wherein said genitalia aperture is configured to insertably receive a male animal's genitalia;
    a collection bag removably coupled to said tubular garment wherein said collection bag is configured to receive animal excrement; and
    an adhesive layer coupled to a perimeter of an opening in said collection bag, said collection bag being positionable around said excrement aperture wherein said adhesive layer engages an outside surface of said tubular garment wherein said adhesive layer retains said collection bag on said tubular garment wherein said collection bag receives the animal's excrement.

\* \* \* \* \*